United States Patent [19]

Wenzel et al.

[11] Patent Number: 5,212,866
[45] Date of Patent: May 25, 1993

[54] METHOD FOR THE MANUFACTURING OF A DEEP-BED WHEEL RIM

[75] Inventors: Helmut Wenzel, Beckum; Karl-Heinz Köstermeier, Rietberg, both of Fed. Rep. of Germany

[73] Assignee: Leifeld GmbH & Co., Ahlen, Fed. Rep. of Germany

[21] Appl. No.: 823,634

[22] Filed: Jan. 22, 1992

[30] Foreign Application Priority Data

Jan. 25, 1991 [DE] Fed. Rep. of Germany ....... 4102139

[51] Int. Cl.⁵ .............................................. B21H 1/10
[52] U.S. Cl. .................................. 29/894.354; 72/82; 72/105
[58] Field of Search ....................... 29/894.35, 894.354, 29/894.362; 72/82-84, 91, 105

[56] References Cited

U.S. PATENT DOCUMENTS

| 2,139,833 | 12/1938 | Le Jeune et al. | 29/894.354 |
| 2,185,347 | 1/1940 | Le Jeune | 29/894.354 |
| 4,170,888 | 10/1979 | Golata | 72/82 |

FOREIGN PATENT DOCUMENTS 2001472 7/1971 Fed. Rep. of Germany .
2204953 8/1973 Fed. Rep. of Germany .
229432 10/1986 Japan ................ 29/894.354

*Primary Examiner*—P. W. Echols
*Attorney, Agent, or Firm*—Felfe & Lynch

[57] ABSTRACT

Disclosed are a method, apparatus and tool for the manufacture of a deep-bed wheel rim from a hollow cylindrical preform. In the method the metal preform is shaped to the deep-bed rim in a single mounting on a single tool of several parts, and the constriction of the middle part of the preform to make the bed is performed with concentric rotation of tool and preform. The side portions of the preform are widened to make the bead flanges by a radial shifting of the axis of rotation of the preform together with a tool part shifting appropriately in the plane perpendicular to the axis of rotation to make the bed and the bead seat. The pressing at least during the widening takes place inwardly in a single radial direction, the direction of the axial shift corresponding to the pressing direction. The invention furthermore relates to an apparatus for the practice of the method. According to the invention, this apparatus is a pressing machine with two spindles which bear a tool in common. This tool has a part which is displaceable in a plane perpendicular to the spindles' axis of rotation.

4 Claims, 4 Drawing Sheets

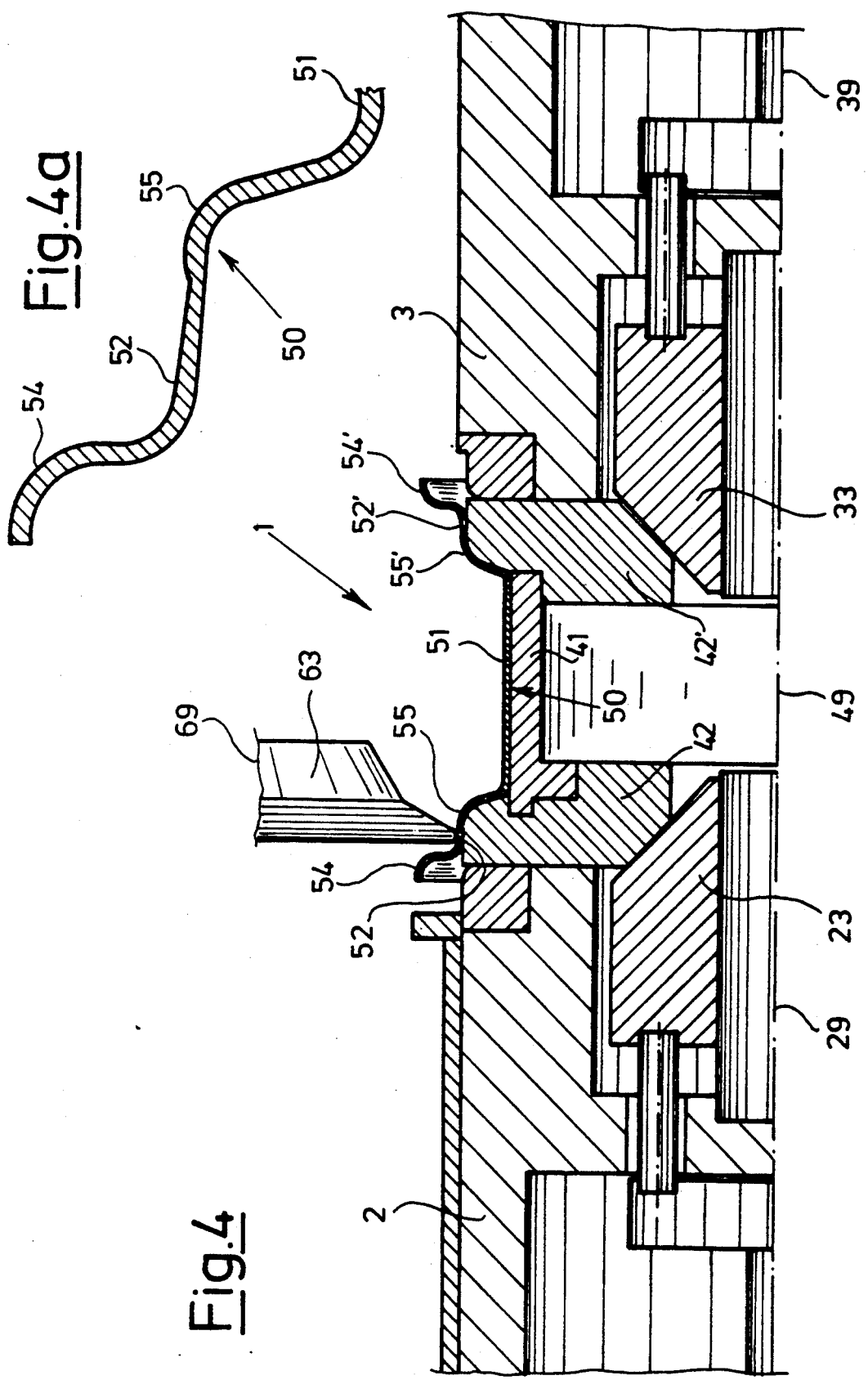

METHOD FOR THE MANUFACTURING OF A DEEP-BED WHEEL RIM

BACKGROUND OF INVENTION

The present invention is in a method for the manufacture of a deep-bed wheel rim from a hollow cylindrical metal preform and apparatus for the practice of the method.

A method and apparatus for production of a deep-bed wheel rim from a preform are disclosed, for example, in the German periodical "Werkstatt und Betrieb" 103 (1970) 10, p. 792. According to the known method, a hollow cylindrical preform rolled from a strip of steel is fed to a set of machines consisting of three individual units. The first machine preliminarily shapes the preform. The second machine completes the bed of the rim and at the same time turns the bead seat at an angle. The third machine shapes the two bead flanges, the rim being reversed and remounted after the first bead flange is shaped. The rim is then gauged on a special machine to improve accuracy of production.

The known method has numerous disadvantageous because it involves a complex procedure with many dead periods due to the frequent remounting of the workpiece, is labor intensive in set-up time and offers little flexibility for the production of different rim sizes. Such drawbacks result in relatively long production time and high costs.

An object of the present invention is to provide a method for the production of deep-bed wheel rims which offers a improved and more advantageous procedure with less dead time, less technical complexity and greater flexibility. Another object is to provide an apparatus for the practice of the method.

SUMMARY OF THE INVENTION

The first object of the invention is obtained by mounting the preform once on a single apparatus. The center portion of the preform is drawn in to form the recessed bed of the wheel rim by a concentric rotation of the preform in the apparatus and of a tool. The tool is constructed of a plurality of parts. The side portions of the preform are widened to form a bead seat by a steadily increasing radial displacement of the axis of rotation of the preform, up to an established maximum, together with a tool part of the tool for the rim bed and bead seat shifting accordingly in the plane perpendicular to the axis of rotation. At least during the widening, there is a pressing in a single inward radial direction, the direction of the axial displacement corresponding to the direction of pressure. The hump in an area of the bead seat is formed while the latter retains a substantially unchanged diameter.

The method of the invention requires only a single mounting of the steel rim preform on a single apparatus. The rim is then produced from the preform without any remounting. The remountings are dispensed with because the constricting and spreading operations are made possible in the course of the method by the controlled shifting of the axis of rotation of the rim preform or of the rim and a part of the tool, without remounting the rim or the preform. Since all of the shaping operations within the method are performed in a single mounting, the rim formed has a very high accuracy of dimensions and roundness, making any additional gauging superfluous. Also, dead time is largely eliminated, because the method requires but a single machine with a single tool, which assures moderate production costs. Also, in the production of rims of different sizes the changeover of only one machine is necessary, thus offering high flexibility.

The invention furthermore provides that the radial shift of the axis of rotation of the steel preform together with the shifting part of the tool is performed by the pressure against the controllable counterforce of the shifting parts of the tool. Thus, in a relatively simple manner, the dynamic procedure of pressing during the axial displacement can be controlled. The radial shaping speed especially can be regulated by the magnitude of the counterforce and adapted to the properties of the material being used.

An additional feature of the method of the invention, the constriction of the middle portion of the steel preform to produce the rim bed is performed with the axial squeezing together of the ends of the preform. This procedure avoids or minimizes any undesirable weakening of the material of the rim as a result of excessive stretching and achieves improved strength properties.

The method also provides that the hump is formed on the bead seat of the rim by thinning material in the portion of the bead seat that is axially outside of the hump. In this manner the manufacturer can obtain an additionally improved distribution of material, together with greater strength in the rim with minimized use and weight of material. Furthermore, any negative contour of the hump on the outer circumference of the rim is avoided and instead a smooth surface is produced.

The invention proposes an apparatus to obtain the second stated objective for the practice of the method.

The apparatus is a pressing machine with at least two linearly aligned rotatable spindles, each spindle having a confronting end and axis of rotation. At least one of the spindles is motor driven, and at least one spindle is displaceable in the axial direction. There is a rotationally symmetrical tool at confronting ends of the spindles. The tool is formed of at least a first tool part and a second tool part, the second tool part is adapted to form the two rim flanges. The first tool part is mounted for displacement perpendicular to the spindle axis of rotation and, during the pressing, can be brought from a position coaxial with the tool parts for the bead flanges and with the spindle into a position with a parallel axis of rotation offset in a radial direction. At least one press roller is displaceable in the radial direction.

With an apparatus of this kind the method of the invention can be practiced without problems, only the tool with its part that is displaceable transversely of the axial direction requires a special construction and apparatus for its operation. Otherwise a pressing machine known in itself can be used as the apparatus. The cost of the technical practice of the new method can be kept low in this manner, inasmuch as pressing machines already available can be converted to execute the process.

In a preferred embodiment of the invention an axially displaceable cone is disposed concentrically in at least one spindle, and the tool part which is displaceable in the plane perpendicular to the axis of rotation has a conical counter-surface conforming to the cone.

In a further preferred embodiment, an end position of the cone in which the latter is driven into the conical counter-surface of the corresponding tool part, the tool part is locked in a position coaxial with the other tool parts and with the spindles, and in the other end position of the cone in which the latter is withdrawn from the counter-surface of the corresponding tool part by a given maximum amount, the latter tool part has its maximum displaceability in the plane perpendicular to the axis of rotation.

In still another preferred embodiment at least one cone is disposed in each of the two spindles confrontingly, the tool part is displaceable in the plane perpendicular to the axis of rotation and has two corresponding conical counter-surfaces, and the two cones are axially shiftable contrariwise under control by a coupled shifting system. Preferably, the shifting system comprises at least one piston-and-cylinder unit.

In another advantageous embodiment the first tool part that is displaceable in the plane perpendicular to the axis of rotation is formed of a central rim bed tool element and at least two bead seat tool elements adjoin in the axial direction.

In yet another embodiment, the rim bed tool element and the one bead seat tool element together with the one bead flange tool part are associated with one spindle and the other bead seat tool element and the other bead flange tool part are associated with the other spindle, and are rotatable together with the spindle as well as axially displaceable. Most preferably, the rim bed tool element is joined in an easily releasable manner to the corresponding bead seat tool element and is exchangeable for bead seat tool elements of different axial length.

The various features of novelty which characterize the invention are pointed out with particularity in the claims annexed to and forming a part of this specification. For a better understanding of the invention, its operating advantages and specific objects obtained by its use, reference should be had to the accompanying drawings and descriptive matter in which there is illustrated and described a preferred embodiment of the invention.

BRIEF DESCRIPTION OF DRAWINGS

FIG. 4 shows the apparatus with workpiece, in a fragmentary longitudinal section, during a fourth and final phase of the process; and FIG. 4a shows a enlarged detail of the workpiece of FIG. 4.

DESCRIPTION OF PREFERRED EMBODIMENT

Figure 1:
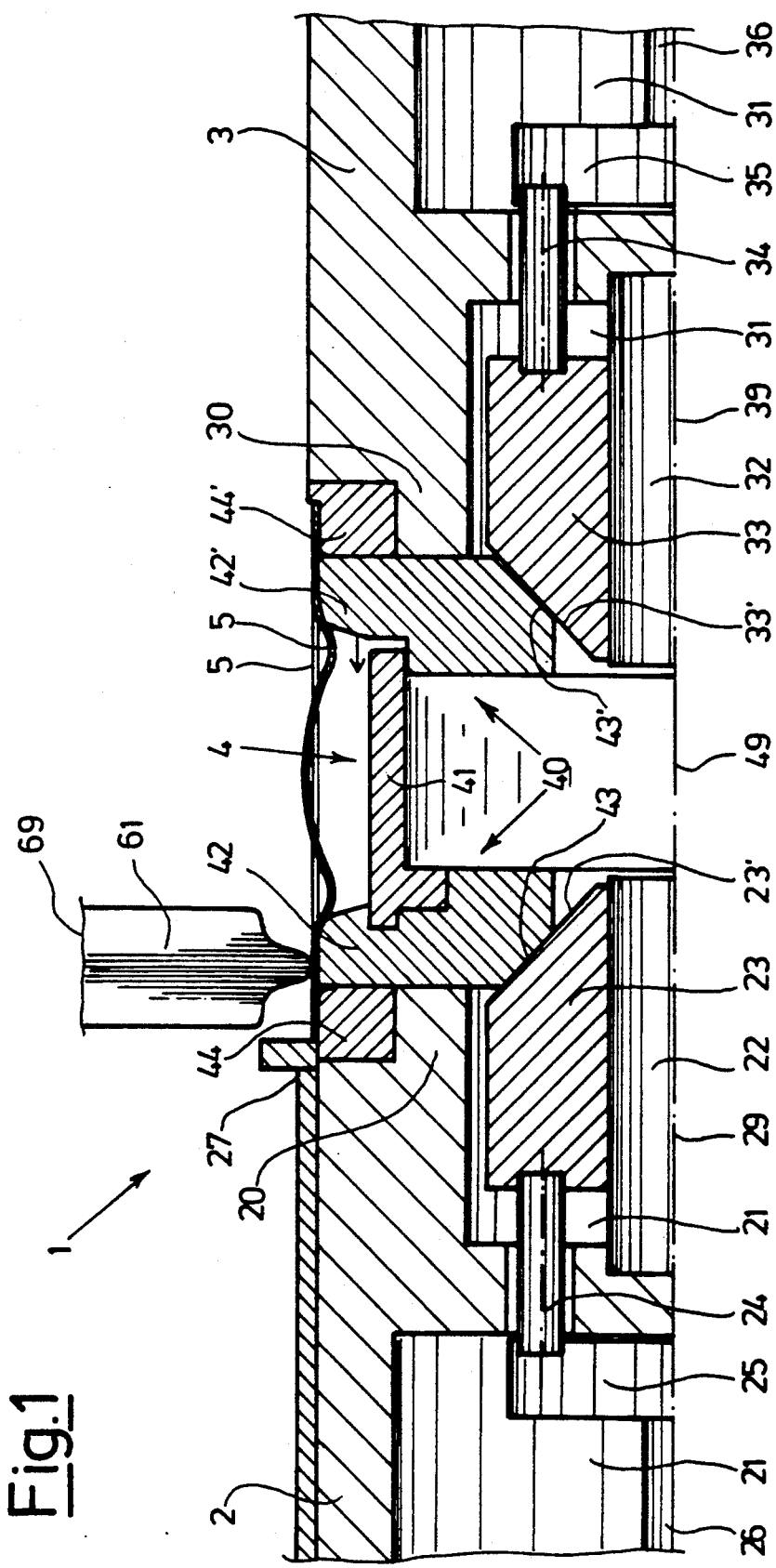
FIG. 1 is a fragmentary longitudinal section of an apparatus with a workpiece during an initial phase of the process.

FIGS. 1 to 4 show a section of an apparatus for the manufacture of deep-bed wheel rims, the apparatus in this case being a pressing machine 1. Referring to FIG. 1, the apparatus 1 has a first spindle 2 on the left side and a second spindle 3 on the right. A tool 4 is disposed intermediate the two ends 20 and 30 of the spindles 2 and 3. A first press roller 61 is positioned above the spindles 2 and 3.

Spindles 2 and 3 are linearly aligned and each is rotatable about its respective axes 29 and 39. At least one of the spindles 2 and 3 is drivable, although preferably both spindles 2 and 3 are drivable in synchronism. For greater ease in studying the drawing, in FIG. 1 only the upper half of spindles 2 and 3 and of tool 4 are represented; but the second or lower half would be a mirror image of the upper half about axes 29 and 39, respectively.

Spindle 2 is formed with a cavity 21. A cone 23 is mounted for axial displacement along a central cylindrical guide 22 within cavity 21 adjacent end 20. On its side facing the tool 4 the cone 23 has a tapered surface 23'. On its rear side the cone 23 is connected by a plurality of intermediate pieces 24, only one of which is shown here, to a circular disk-shaped actuating plate 25. Actuating plate 25 in turn is displaceable axially by the piston rod of a piston-and-cylinder unit 26. Therefore, by the actuation of the piston-and-cylinder unit 26, the axial position of the cone 23 relative to the rest of the spindle 2 and to the tool 4 can be varied.

Spindle 3 is symmetrical with the first spindle 2. Spindle 3 has a cavity and there is again a cone 33 with its tapered surface, a plurality of intermediate pieces 34, an actuating plate 35 and a piston-and-cylinder unit 36. Here too the cone 33 is mounted for axial displacement along a central cylindrical guide 32, the displacement being performed by actuating the piston-and-cylinder unit 36. Furthermore, in the embodiment here represented, of the pressing machine 1, spindle 3 is movable as a whole in the axial direction.

At least one of the spindles 2, 3 is displaceable in the axial direction for mounting the workpiece 5 in the apparatus and removing the workpiece therefrom. Spindle 3 together with guide 32, cone 33, intermediate piece 34, actuating plate 35, piston-and-cylinder unit 36 and tool-parts 42' and 44' are axially displaceable as a whole. Cylindrical guide 22 is fixed in its position except for its ability to rotate.

Tool 4 is formed of a plurality of tool parts or elements, and first a division into two parts is provided. The first tool part 40 comprises a middle tool element 41 and, adjoining the latter on the right and left, tool elements 42 and 42'. At the ends 20 and 30 of the two spindles 2 and 3 tool parts 44 and 44' are disposed behind the tool elements 42 and 42'. The elements 41 and 42 of tool part 40 are releasably joined to one another, while between tool element 41 and tool element 42' a sliding displacement is possible, as indicated by the movement arrow at the upper part of tool element 42', and this displacement is produced by displacement of the spindle 3.

Tool elements 42 and 42' are, like the tool element 41 and tool parts 44 and 44', configured as rotationally symmetrical, angularly rotating parts. Tool elements 42 and 42' are formed with center openings having inwardly tapering surfaces 43 and 43' providing countersurfaces for cone surfaces 23' and 33', respectively. In the state of the pressing machine 1 here represented, the two cones 23 and 33 are firmly driven against the tool elements 42 and 42', causing the tool elements 42 and 42' together with tool element 41 to be held in a position coaxial with spindles 2 and 3. This signifies that, in this state, the tool part 40, consisting of the elements 41, 42 and 42', is rotatable about an axis 49 coinciding with the axes 29 and 39 of spindles 2 and 3.

FIG. 1 also shows a workpiece 5 clamped onto the tool 4 in two working states, wherein workpiece 5 is here first a hollow cylindrical metal preform as represented by the thin lines under the reference number 5. In a first step the press roller 61, which is rotatable about an axis 69 parallel to the axes 29, 39 and 49, shapes the cylindrical preform 5 into a sinuously preformed workpiece 5, this shaping being performed with a simultaneous axial thrusting together of spindles 2 and 3. To prevent any unintentional shifting of the workpiece 5, spindle 2 has on its outside a revolving abutment and ejector 27 which is axially displaceable as well as lockable in a desired position. The ejector 27 also serves to eject the workpiece 5 after it has been processed. At the opposite end of the workpiece 5, adjacent spindle 3, the tool part 44' has a step-like abutment.

Figure 2:
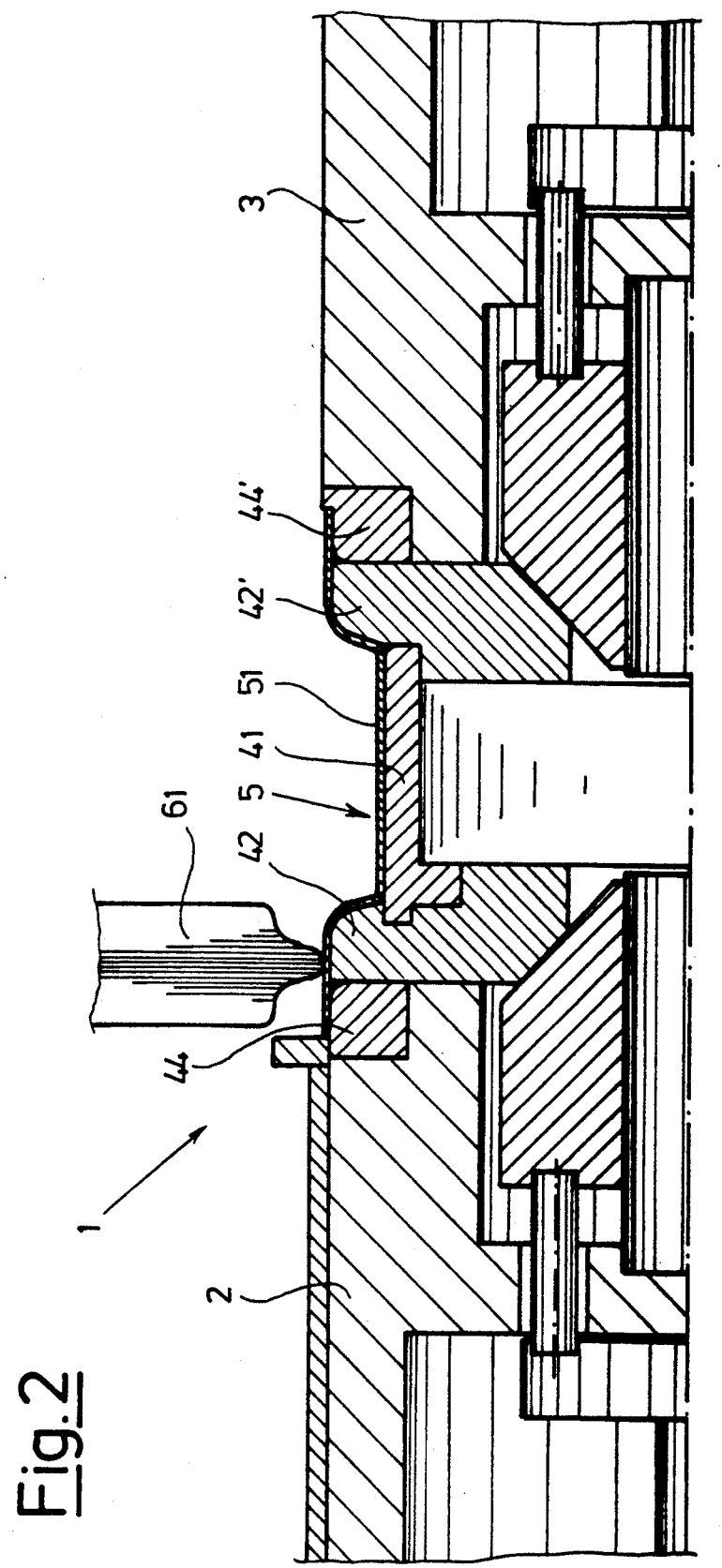
FIG. 2 is also a fragmentary longitudinal section but shows the apparatus with a workpiece during a second phase of the process.

FIG. 2 shows in the same manner as FIG. 1 a state of the pressing machine 1, in which spindles 2 and 3 have been drawn as closely together as possible, so that the tool element 41 is in firm contact with tool element 42'. Furthermore, the workpiece 5 has meantime been shaped to such an extent that its inside circumference lies fully against tool parts 44 and 44', and against tool elements 41, 42 and 42', i.e., a bed 51 has been formed in the central part of the wheel-rim workpiece 5.

In the method, there is an axially thrusting together of spindles 2 and 3 with a pressing of the press roller 61, pressing in one step the workpiece area near tool-part 42 and in another step the workpiece area near tool-part 42' slightly inward in a direction toward the tool-part 41.

Figure 3:
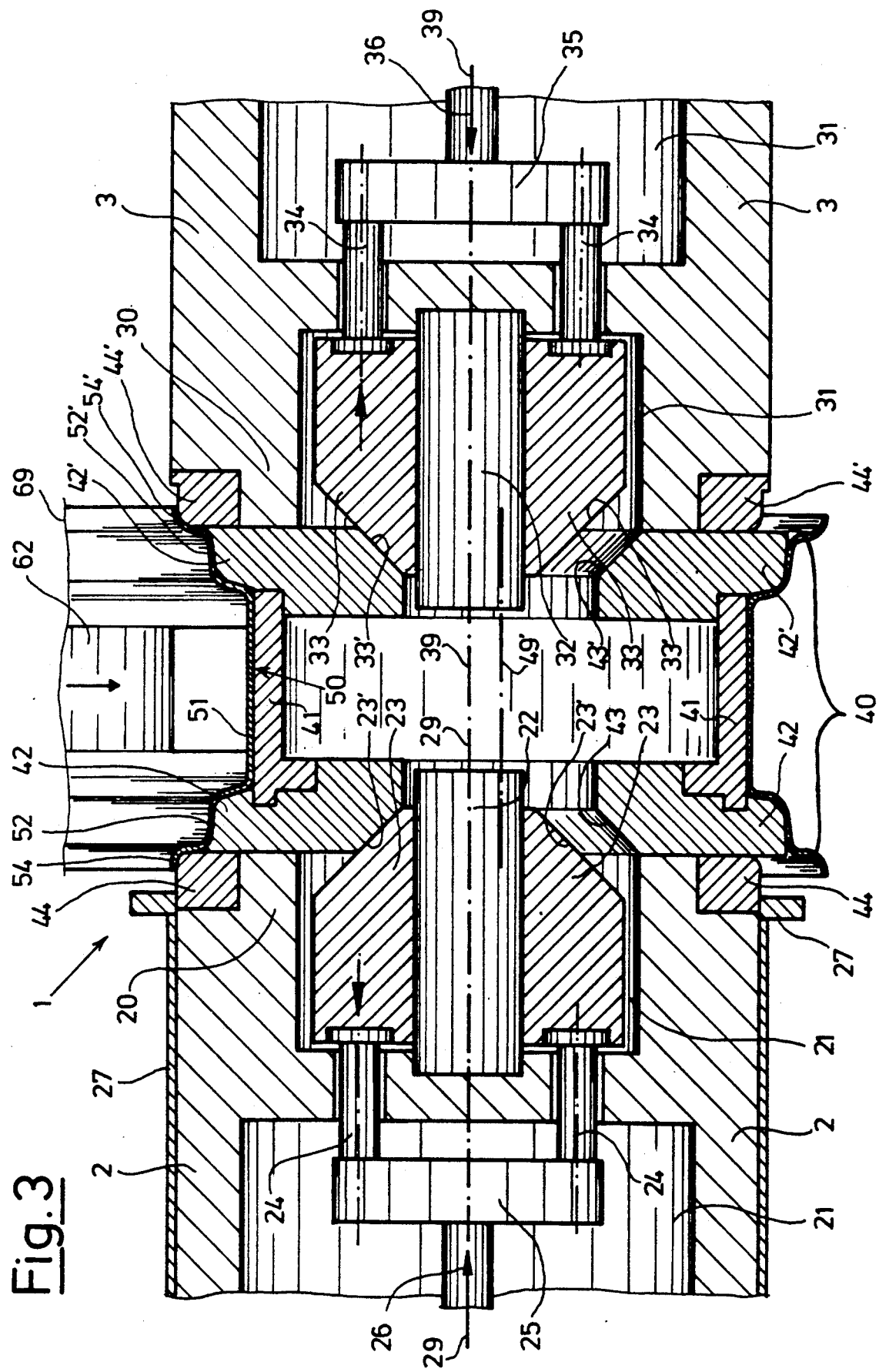
FIG. 3 shows the apparatus with workpiece in a complete longitudinal section, partially in a side view, during a third phase of the process.

FIG. 3 again shows two spindles 2 and 3 of the apparatus 1, but with their lower halves. In the state of the pressing machine depicted in FIG. 3, cones 23 and 33 have been shifted apart by the same amount by corresponding actuation of the piston-and-cylinder units 26, i.e., the left cone 23 has shifted to the left and the right cone 33 to the right, as indicated by the arrows on the cones 23 and 33. This shifting brings about a condition such that the cone surfaces 23' and 33' are no longer engaged over their entire circumference with the corresponding matching cone surfaces 43 and 43', respectively, but that their only remaining contact is in the upper part of cones 23 and 33 on the one hand and the tool elements 42 and 42' on the other. A second press roller 62 provides for this contact, this press roller being rotatable about an axis 69 parallel to the spindle axes 29 and 39. By the pressure exerted by this press roller 62 the tool part 40 consisting of the tool elements 41, 42 and 42' is shifted in a direction perpendicular to the axes 29 and 39, i.e., in a radial plane. This shifted state of tool part 40 is shown in FIG. 3, wherein the axis of rotation of the shifted tool part 40, as axis 49', now is in a shifted position running parallel to the axes 29 and 39, as clearly shown in FIG. 3. By this application of the press roller 62 which takes place always at a given rate of advance, bead seats 52 and 52' are formed on each outer margin of the workpiece 5, plus bead flanges 54 and 54'. The forming of the bead flanges results because the tool parts 44 and 44' do not accompany the shift of the tool part 40. In a single set-up, therefore, not only constrictions as required in the area of the wheel-rim bed 51 but also flaring as needed in the area of the bead flanges can be performed. With this procedure the workpiece 5 is converted to the basic shape of the wheel rim 50.

After formation of bead flanges 54 and 54', cones 23 and 33 are driven again into the tool elements 42 and 42' until the tool part 40, which is displaceable in the radial plane, is again in a position coaxial with spindles 2 and 3.

This restored coaxial position of spindles 2 and 3 and tool elements 41, 42 and 42' is shown in FIG. 4. Here, again, the same manner of representation is used as in FIGS. 1 and 2, showing only the upper half of spindles 2 and 3 and of tool 4. The last step performed on the rim 50 serves to produce humps 55 and 55' on the inner marginal portion of the bead seats 52 and 52'. The production of the hump 55 is performed by means of an addition press roller 63, which also is rotatable about an axis 69 parallel to the spindle axes 29 and 39. For this purpose the material of the rim 50 is thinned in the outer part of the bead seat 52, 52', so that the hump 55, 55', is raised above the rest of the bead seat 52, 52'.

This shaping of the rim 50 is shown again on a larger scale in a fragmentary view in FIG. 4a, wherein, from left to right, the rim 50 first has the bead flange 54, then the outer marginal portion of the bead seat 52 where the material is thinned, and then the hump 55 situated at the inner marginal portion of the bead seat, and lastly the bed 51 of the rim.

As can be seen quite clearly in the drawing figures, the production of wheel rims of different widths can be obtained by substituting a different tool element 41. If the diameter of the rim is to be changed, the complete tool 4 is replaced.

The control of the displacement of the cones and the application and selection of the press rolls is best performed by an electronic control apparatus, such as a computerized numerical control ("CNC"), which is commonly used for controlling machine tools.

The terms and expressions which have been employed ar used as terms of description and not of limitation and there is no intention in the use of such terms and expressions of excluding any equivalents of the features shown and described or portions thereof, it being recognized that various modifications are possible within the scope of the invention.

We claim:

1. A method for the manufacture of a deep-bed wheel rim from a hollow cylindrical metal preform having a central portion and side portions, said wheel rim being adjoined toward the sides by a bead seat with a hump, and at the outer sides by a bead flange, the method comprising:

mounting the preform once on a single apparatus;
   drawing in the center portion of the preform to form a recessed bed of the wheel rim by a concentric rotation of the preform in the apparatus and of a tool, said tool being made up of a plurality of parts;
   widening a side portion of the preform to form a bead seat by a steadily increasing radial displacement of the axis of rotation of the preform, up to an established maximum, together with a tool part of said tool for the rim bed and bead seat shifting accordingly in the plane perpendicular to the axis of rotation of the preform;
   at least during the widening, pressing in a single inward radial direction, the direction of displacement of the axis of rotation of the preform corresponding to the direction of pressing; and
   forming a hump in an area of the bead seat while the bead seat retains a substantially unchanged diameter.

2. The method of claim 1, wherein the radial displacement of the axis of rotation of the preform together with the shifting tool part is preformed by the pressing force against a controllable counterpressure of the shifting tool part.

3. The method of claim 1 wherein the drawing in of the center portion of the preform to form the bed is performed with an axial pushing together of the sides of the preform.

4. The method of claim 1 wherein the hump is formed on the bead seat by thinning the material in the portion of the bead seat lying axially outside adjacent to the hump.

* * * * *